PROCESS OF SELECTIVE ETCHING WITH RESIST PREPARATION

Filed Jan. 5, 1959 2 Sheets-Sheet 1

INVENTORS H. CHRISTENSEN
W. S. NOLL
BY
George S. Indig
ATTORNEY

PROCESS OF SELECTIVE ETCHING WITH RESIST PREPARATION

Filed Jan. 5, 1959

INVENTORS H. CHRISTENSEN
W. S. NOLL

BY George S. Indig

ATTORNEY

United States Patent Office 3,012,920

Patented Dec. 12, 1961

3,012,920

PROCESS OF SELECTIVE ETCHING WITH RESIST PREPARATION

Howard Christensen, Springfield, N.J., and Walter S. Noll, Reading, Pa., assignors to Bell Telephone Laboratories, Incorporated, New York, N.Y., a corporation of New York Filed Jan. 5, 1959, Ser. No. 785,022
14 Claims. (Cl. 156—11)

This invention relates to a method of selectively etching a body of semiconductive material of particular importance in the preparation of semiconductive devices.

In the fabrication of semiconductive devices, it may become necessary at some point in the procedure to etch certain portions of the surface of the device. In many of such instances, it is vital to the operability of the finished device to protect certain other portions of the surface during the etching step. The usual method in the art for accomplishing such selective etching is to employ a mask of an etch-resistant material to cover the portions of the semiconductive body to be protected.

An important requirement of the material from which the etching mask is fabricated is that it adheres strongly to the surface of the semiconductive body so as to prevent seepage of the etchant underneath the mask. Many of the materials of the prior art which possess the requisite property of adherence are, by their very nature, exceedingly difficult to remove following the etching procedure. Since the presence of even the smallest quantities of foreign matter on the surface of a semiconductive device may have an adverse effect upon its operating characteristics, the incomplete removal of an etching mask may result in a device of poor quality. Another requisite of a masking material is that it be amenable to a simple, accurate method for depositing it on the areas of the semiconductive body to be protected. Thus the essential requirements of a good masking material are: first, that it be resistant to the etchant which is to be employed; second, that it adhere to the substrate; third, that it may be completely removed from the surface following the etching procedure; and fourth, that it may be accurately positioned on the semiconductive surface. It is, of course, to be appreciated that neither the mask material itself nor the means employed for its removal may be such as to have a deleterious effect on the semiconductive body being processed.

The selective etching method of this invention embodies a mask which is possessed of all of the aforementioned requirements. The mask of the present invention is a laminar structure consisting of two layers. The underlying layer, which is deposited directly upon the semiconductive surface, consists of an evaporated film of a soluble material which adheres tenaciously to the substrate. The outer layer, superimposed over the first layer, consists of an evaporated film of an etch-resistant material which serves to protect the underlying area of the substrate.

In accordance with the selective etching method of the present invention, the mask is deposited on the selected portions of the semiconductive surface by evaporating the components through a mask in accordance with conventional evaporation techniques. (See "Vacuum Deposition of Thin Films," by L. Holland, John Wiley, 1956.) The semiconductive body is then etched by exposing the surface, including the mask, to the etchant. The mask is then removed by treating with a liquid which is a solvent for the underlying layer.

The mask of this invention, being composed of two distinct layers, permits the selection of the materials of construction thereof to be made in accordance with the primary function of each layer. Thus, since the underlying layer need not be etch-resistant, the material of which it is composed may be chosen chiefly from the viewpoint of facilitating its complete removal from the substrate. The outer layer, in accordance with this invention, may be selected primarily for its etch-resistant quality. Heretofore many materials which possess excellent etch-resistant qualities have proved to be unsuitable for use as masking materials by reason of the extreme difficulty or impossibility of removing masks thereof from the substrate. This drawback to the use of such materials is obviated by use of the present masking method. Since the outer layer of the masks of this invention is not in direct contact with the semiconductive surface, dissolution of the underlying layer frees the outer layer of the mask and permits it to be easily washed or floated away.

The invention will be more fully understood from the following detailed description taken in conjunction with the accompanying drawings in which.

The figures are not drawn to scale in order to exaggerate certain features for clarity of exposition.

Figure 1:
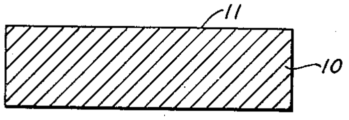
FIG. 1 is a cross-sectional elevational view of a body of semiconductive material to be selectively etched in accordance with this invention.

With respect now more fully to the drawings, FIG. 1 depicts a body of semiconductive material 10 which is to be selectively etched in accordance with the present invention. For the purposes of this description, it is assumed that the entire surface area of body 10 is to be etched with the exception of a small circular area on the upper surface 11 of the body.

Figure 2A:
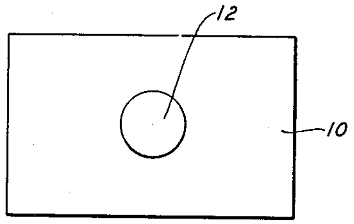
FIG. 2A is a plan view of the body of FIG. 1 on which there has been deposited the underlying layer of a protective mask in accordance with this invention.
Figure 2B:
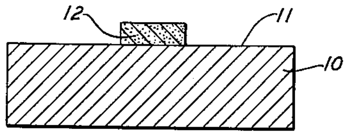
FIG. 2B is a cross-sectional elevational view of the body shown in FIG. 2A.

In accordance with this invention, an underlying layer in the shape of a circle of the desired diameter is deposited on surface 11 of body 10. FIGS. 2A and 2B show body 10 depicting underlying layer 12 on surface 11.

For reasons discussed in detail below, underlying layer 12 is made of the order of 10 to 200 angstroms thick. The use of conventional evaporation techniques to produce the underlying layer has been found an effective method for controlling the thickness of layer 12. Additionally, control of both the shape of the underlying layer, and its position on the substrate are facilitated by the use of evaporation methods in conjunction with the masking procedures customarily used therewith.

The requisite adherence of the underlying layer to the substrate follows from the fact that the layer is extremely thin and is formed by evaporative techniques.

Boron trioxide ($B_2O_3$) is preferred for use as the underlying layer material of the masks of the present invention. It is easily evaporated, adheres tenaciously to the semiconductive surface, and may be completely removed by use of a suitable solvent, such as water or alcohol. For this description, it is assumed that layer 12 is boron trioxide.

Figure 3A:
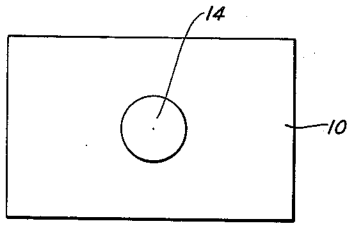
FIG. 3A is a plan view of the body of FIGS. 2A and 2B on which has been deposited the outer layer of a protective mask in accordance with this invention.
Figure 3B:
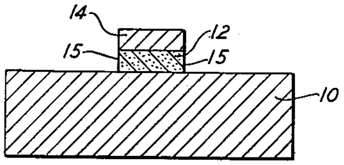
FIG. 3B is a cross-sectional elevational view of the of body shown in FIG. 3A.

The next step of the inventive method comprises the formation of the outer layer of the mask. For the reasons discussed above in conjunction with the formation of the underlying layer, the technique of evaporation is also preferred for the production of the outer layer. FIGS. 3A and 3B show body 10 following deposition of outer layer 14. The only portion of underlying layer 12 which will be exposed to the etchant is peripheral edge 15.

Since the function of the outer layer is to protect the underlying material from attack during the etching procedure, the choice of the material of which the outer layer is composed is dependent upon the particular etchant to be used. As is well known, there are several etchants which are presently used for the etching of semiconductive materials. These etchants differ in the severity with which the material to be treated is attacked, and also, in certain instances, are selective with respect to the semiconductive materials with which they may be used. For the purposes of this description, it is assumed that body 10 is germanium and the etchant to be used in the subsequent step consists of five parts by weight of concentrated nitric acid (70 percent by weight), and one part by weight of concentrated hydrofluoric acid (48 percent by weight), such composition being commonly designated CP–8. The most common materials which are both resistant to this etchant and amenable to deposition by evaporation techniques are metals such as gold and platinum, and oxides such as tungsten trioxide. Any one of these materials or others known in the art to possess the requisite properties may be successfully employed to produce outer layer 14.

Figure 4:
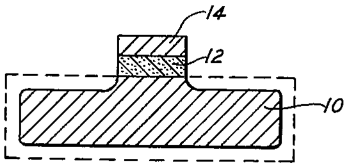
FIG. 4 is a cross-sectional elevational view of the body of FIGS. 3A and 3B subsequent to etching, in accordance with this invention.

Body 10 is then contacted with CP–8 etchant for a time calculated to produce the desired etching effects. FIG. 4 depicts body 10 following such etching step. As may be seen, the surface area of the body was attacked at all portions save that protected by the mask.

Figure 5:
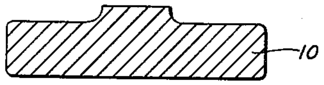
FIG. 5 is a cross-sectional elevational view of the body of FIG. 4 after removal of the protective mask.

The final step in the etching procedure of this invention consists of the removal of the mask from body 10, accomplished by dissolving underlying layer 12 in a suitable solvent. Such dissolution is effectively brought about by immersing body 10 in a water bath. As the water comes in contact with the exposed edges of underlying layer 12, the layer begins to dissolve. When underlying layer 12 has been completely dissolved, outer layer 14 may be simply floated or washed away. FIG. 5 depicts semiconductive body 10 following removal of the mask.

The time for removal is usually of the order of 30 minutes to one hour. However, this period may be substantially decreased by supersonic agitation of the solvent bath.

In many instances the etchant which is used for eroding the semiconductive body may contain reagent which is a solvent for the material of which underlying layer 12 is composed. This situation is present in the above-described example since the etchant consisted of an aqueous solution. Premature removal of the mask during the etching procedure which may result by virtue of the solution of the underlying layer by such etchant is avoided by careful attention to the thickness of the exposed peripheral edge of the underlying layer. The time required to dissolve the underlying layer after it is in contact with the solvent is inversely related to the thickness of the exposed peripheral edge 15 of the underlying layer. This relationship results from the fact that at the small thicknesses involved, the rate of solution of the underlying layer is substantially limited by the diffusion-limited layer of etchant in contact with edge 15. Accordingly, by depositing the underlying layer in such manner as to present the smallest exposed surface area possible, the tendency toward premature removal is diminished.

The most important aspect of the removal step is the degree of removal of the mask. It has been determined that the presence of sub-microscopic particles of foreign matter have an adverse effect upon the characteristics of the finished device. That the removal procedures of the present method result in substantially complete elimination of mask material from the surface of the semiconductive body is evidenced by the excellent electrical characteristics of semiconductive devices produced in accordance therewith. Such complete removal is made possible by the utilitarian design of the masks of this invention which permits the underlying layer to be chosen primarily for the ease with which it may be dissolved in a suitable solvent.

Use of the selective etching procedure of the present invention in the fabrication of a diffused-base transistor is described in detail below. A description of the basic design and operation of this transistor may be found in copending application Serial No. 496,202, filed March 23, 1955.

Figure 6A:
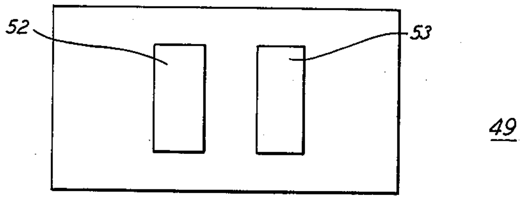
FIG. 6A is a plan view of a diffused-base transistor at one stage in the process of its manufacture.
Figure 6B:
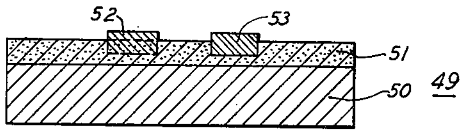
FIG. 6B is a cross-sectional elevational view of the transistor of FIG. 6A.

FIGS. 6A and 6B depict a diffused-base transistor 49 at an intermediate stage of the fabricating process. Transistor 49 is ready to be etched for the purpose of reducing the collector junction area, having been fabricated up to this point in accordance with the procedures described in the above copending application. Shown in FIGS. 6A and 6B is p-type collector zone 50, n-type base zone 51, aluminum emitter 52, and gold-antimony base contact 53.

At this stage of the procedure, it is desired to etch the device in a manner to reduce the junction between collector zone 50 and base zone 51. To prevent attack of the emitter 52, base contact 53 and semiconductive surface areas contiguous thereto, the conventional procedure is to deposit a protective mask on these vulnerable portions of the device.

Figure 7:
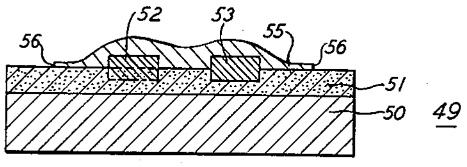
FIG. 7 is a cross-sectional elevational view of the transistor of FIGS. 6A and 6B on which there has been deposited the underlying layer of a mask in accordance with this invention.

FIG. 7 shows transistor 49 upon which has been deposited underlying layer 55 of boron trioxide in accordance with this invention. As shown in FIG. 7, layer 55 is thinner in the vicinity of peripheral edge 56 as compared with the portion covering the emitter and base contact stripes. This variation in thickness is necessitated by consideration of two factors. For the reasons discussed above, peripheral edge 56 is preferably as thin as possible. The extra thickness in the vicinity of the alloyed stripes is necessitated by the peculiar nature of the surfaces of such alloyed areas which are characterized by a sharply changing contour of tall peaks and deep valleys. Accordingly, to assure complete coverage of the entire alloyed surface, underlying layer 55 is made thicker in these areas.

In general, the aforementioned variation in thickness in underlying layer 55 may be obtained by use of a vignetting procedure during the evaporation step. In such manner, vapor molecules, which would otherwise tend to increase the thickness of the edges 56 of underlying layer 55 are diverted, thus producing a differential in the thickness across the underlying layer.

One convenient method for producing such variation involves the use of an evaporating mask which has an opening smaller than the area of the substrate to be masked. The evaporation mask is spaced from the substrate, and the evaporation source is positioned above the opening in the evaporation mask and within a vertical plane perpendicular to the substrate. The substrate and the evaporation mask, which are parallel, are caused to oscillate as a unit about an axis positioned below the substrate and within the aforementioned vertical plane. The oscillation is controlled so that the unit describes an arc, the extremities of which are equidistant from the evaporation source.

When the opening in the evaporation mask is at such point in its oscillation path that it is perpendicular to the aforementioned vertical plane, vapor molecules impinge on a portion of the substrate which is coterminus with the opening since the plane of the opening is essentially perpendicular to emission paths of the impinging molecule. As the opening moves away from this position, the area of the substrate upon which vapor molecules impinge changes since vapor molecules whose paths are abnormal to the plane of the opening impinge on the substrate. When the evaporation mask and substrate are at the outermost point of their oscillation path, the portion of the substrate upon which vapor molecules impinge is much larger in area than the opening in the evaporation mask. At this point, the portion of the substrate upon which vapor molecules impinge includes the area of the substrate which was exposed when the opening in the evaporation mask was perpendicular to the emission paths of the impinging molecules. Accordingly, this evaporating procedure results in an evaporated layer the thickness of which varies across one dimension.

If two sources are substituted for the one source employed in the procedure outlined above, it is possible to vary the thickness across the other dimension of the mask.

Figure 8:
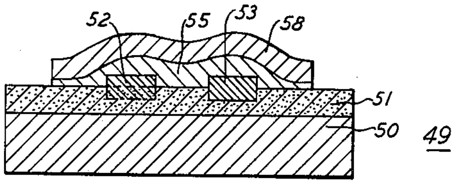
FIG. 8 is a cross-sectional elevational view of the transistor of FIG. 7 on which there has been deposited the outer layer of a mask in accordance with this invention.

FIG. 8 depicts transistor 49 upon which gold layer 58 has been evaporated.

Figure 9:
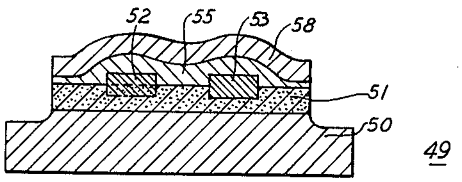
FIG. 9 is a cross-sectional elevational view of the transistor of FIG. 8 after it has been etched in accordance with this invention.

The device is then contacted with CP–8 for a period of time calculated to reduce the collector junction in the desired manner. Etched transistor 49 is depicted in FIG. 9.

In the fabrication of this type of device, that is, where a mesa is to be formed by means of an etching procedure, it has been determined that the etching is preferably accomplished by directing a stream of etchant at the surface to be etched. An important advantage of this method resides in the fact that fresh etchant is continually being brought into contact with the portions of the semi-conductive body to be eroded thus reducing the time of the etching step. Such reduction in the time during which the mask is in contact with the etchant minimizes the tendency of the underlying layer to dissolve during the etching step.

Figure 10:
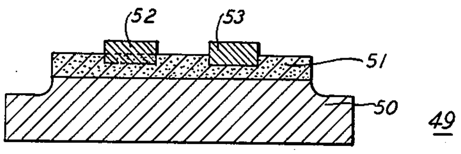
FIG. 10 is a cross-sectional elevational view of the transistor of FIG. 9 following the removal of the mask.

Removal of the mask is accomplished in the manner described above. Transistor 49 following such removal is shown in FIG. 10.

The present invention offers an additional advantage in the manufacture of devices of the type described above. The usual method of producing semi-conductive devices of the described type involves the use of a large slab or block of semiconductive material which is subsequently divided into a plurality of individual bodies, each of which constitutes a semi-finished device. In many of the prior art processes wherein a low melting point masking material is employed, the steps of dividing the large block of semiconductive material and alloy-mounting the individual semi-finished devices on individual headers precede the masking step. This sequence of processing is necessitated by the fact that the low melting masking materials, if applied to the individual devices prior to the mounting step, would melt and/or become distorted upon the application of heat required for the mounting step. Accordingly, the masking step, which involves positioning and aligning an evaporation mask with respect to the substrate, must be conducted separately for each of the semi-finished devices.

The relatively high melting points of the materials used to fabricate the masks of the present invention permit of a far more efficient process of manufacture. Since the heat applied during the alloy-mounting step does not affect the masks of this invention, the masking procedure may be conducted at a point in the processing before division of the slab of semiconductive material. Thus, use of the present invention permits all of the devices in one slab of semiconductive material to be masked by a single procedure which requires approximately the same expenditure of time as the masking of one of the individual devices.

As illustrative of the advantage to be gained by the aforementioned properties of the masks of this invention, a process is described in which the emitter and base-contact stripes and both layers of the etching mask are produced in the same evaporation step using the same evaporation mask. In such a process, the evaporation mask, which has openings corresponding approximately to the shape of the stripes, is spaced from the slab of semiconductive material. The openings in the evaporated mask correspond in number with the number of devices to be fabricated from the slab. Separate base-contact and emitter stripes are obtained by offsetting the evaporation sources so that different portions of the surface of the slab are exposed to the respective sources. The underlying layer of the mask of this invention is then produced to cover each set of stripes on the slab by use of the vignetting procedure described above. Finally, the outer layer is deposited thus completing the operation.

The present method is applicable to all types of semiconductive material, the properties of the underlying surface merely affecting the choice of the etchant to be used. Although the illustrations described above are in terms of germanium, it is to be understood that silicon, silicon alloys, germanium alloys, and group III–V ternary and quaternary semiconductors are included among those materials beneficially processed by this invention.

In general, there are two important requirements for a material to be suitable for use as the underlying layer of a mask of this invention. The first requirement is that the material be capable of being deposited on a semiconductive surface by evaporation or similar technique. The second requirement is that a solvent material exists which has a powerful solvent action on the underlying material. In this respect, a preferred underlying layer material is one which reacts with the solvent to form reaction products which are soluble in the solvent. Typical of such preferred material is boron trioxide which reacts with water to form boric acid. Phosphorus pentoxide ($P_2O_5$) is another example of materials in this class.

It is to be understood that combinations of liquids may be used to obtain certain desirable results. Thus, for example, alcohol may be added to water to decrease the surface tension of the resultant solvent. This property is important in that it permits the removal of the mask to be accomplished in a shorter period of time.

The outer layer of the masks of this invention may be composed of any etch-resistant material which is capable of being deposited by evaporation or other similar techniques. In this connection it is to be appreciated that alloys, as well as pure metals, are suitable for use.

Although CP–8 was the etchant used in connection with the illustrative examples described above, it is to be understood that any etchant capable of attacking or eroding semiconductive material is suitable. Thus, for example, an excellent etchant for germanium consists of an aqueous solution of sodium hypochlorite (NaOCl). Suitable outer layer materials for use with this etchant include bismuth trioxide ($Bi_2O_3$) in addition to the noble metals and alloys thereof.

The minimum thickness for the underlying layer of the masks of this invention is approximately 10 angstroms. Layers substantially thinner than 10 angstroms tend to be discontinuous in that portions of the substrate are not covered. In such instance, evaporation of the outer layer of the mask results in direct contact between the outer layer and the substrate in the vicinity of the discontinuities. Such a condition would render removal of the mask difficult if not impossible, especially where the outer layer material reacts or alloys with the semi-conductive substrate.

An upper thickness limit for the underlying layer exists only in those areas adjacent the perimeter. As discussed above, the exposed peripheral edge of the underlying layer is necessarily thin to prevent its premature removal during the etching step.

It has been determined that the presence of water in the underlying layer is an important factor in the determination of the maximum thickness of the peripheral edge thereof. The presence of such water accelerates the tendency of the underlying layer to dissolve during the etching step. To compensate for this increased solubility, the thickness of the peripheral edge of the underlying layer may be decreased to avoid decreasing the etching time. Since use of a thicker underlying layer facilitates removal of the mask, the preferred practice of this invention contemplates a water-free underlying layer. The three common sources of water in the underlying layer are:

(1) Water adsorbed on the semiconductive substrate.

(2) Water in the evaporation source.

(3) Exposure of the underlying layer to a humid atmosphere.

Removal of the water adsorbed on the substrate is accomplished by heating the substrate in a vacuum to a temperature of approximately 200° C. The water in the evaporation source may be eliminated by melting the source in an evacuated system. The aforementioned steps are conveniently conducted immediately prior to the formation of the underlying layer.

The introduction of water into the underlying layer from a humid atmosphere is conveniently avoided by depositing the outer layer in the same sequence of steps and before breaking vacuum.

Use of the aforementioned procedures to eliminate the presence of water in the underlying layer permits peripheral edge thicknesses as high as 200 angstroms to be employed, the preferred thickness being in the range of from 25 to 125 angstroms. The use of peripheral edge thicknesses greater than 200 angstroms necessitates a commensurate reduction in etching time to avoid the tendency toward premature removal.

The thickness of the outer layer of the masks of this invention is not a critical parameter. The basic requirements of this layer is that it protect the immediate underlying area from attack by the etchant. Accordingly, the thickness need only be such as will afford this protection. It has been determined that thicknesses as low as 500 angstroms and as high as 10,000 angstroms are satisfactory. The preferred range of thickness is from 1000 angstroms to 5000 angstroms.

Although, in the description above, it has been indicated that the outer layer is co-extensive with the underlying layer, it is to be appreciated that the masks of this invention are not restricted to this type of configuration. Also within the scope of this invention is a mask in which the peripheral edge of the underlying layer extends beyond the limits of the outer layer. Such a configuration would result, for example, in a situation in which the thickness of the peripheral edge of the underlying layer gradually decreases to zero by reason of the particular vignetting method employed. Contact of such a mask with an etchant which includes a solvent for the underlying layer results in rapid dissolution of the portion of the underlying layer which extends beyond the edge of the outer layer.

Likewise, the outer layer may decrease in thickness to essentially zero at its extremities. In such instance, protection is assured only to those portions of the semiconductive substrate which are beneath an outer layer which is not substantially less than 500 angstroms in thickness.

Although this invention has been described in terms of an outer layer consisting of a pure material, it has been determined that alloys or mixtures of materials are suitable for this purpose. Thus, for example, outer layers consisting of mixtures of gold and aluminum, or gold and silver, have been found to provide the necessary protection. The formation of such outer layer is conveniently accomplished by placing both gold and aluminum, for example, in the same evaporation filament, and evaporating in the conventional manner.

Examples of the present invention are described below:

*Example 1*

A mesa-type transistor device was etched in the following manner. A germanium semi-finished diffused-base transistor device was fabricated in the usual manner to produce an aluminum emitter stripe and a gold alloy base-contact stripe on the diffused surface. The stripes were each 1 mil wide and 6 mils long. The emitter stripe was approximately 1500 angstroms thick and the base-contact stripe approximately 1000 angstroms thick. The collector material was p-type and possessed a resistivity of 1 ohm-centimeter. The base layer was .05 mil thick and had a sheet resistivity of 300 ohms per square.

An underlying layer of boron trioxide ($B_2O_3$) was deposited, by conventional evaporation techniques, over an area of the surface of the transistor which included both the base-contact and the emitter stripes. The boron trioxide layer was of a uniform thickness of 25 angstroms.

An outer layer consisting of 75 atomic percent gold and 25 atomic percent silver of a uniform thickness of 3000 angstroms was deposited on and coextensive with the underlying layer by evaporation techniques.

The device, so masked, was then stream-etched with CP–8 for a period of 8 seconds.

The mask was removed by immersing the device in a supersonically agitated bath consisting of equal parts of isopropyl alcohol and water. Removal of the mask was completed within one minute.

The device so etched had the following characteristics:

Reverse saturation current from collector to base, measured at zero emitter to base current and 5 volts collector bias with respect to base___microamperes .1

Breakdown voltage collector to base, measured at collector to base current of 100 microamperes and zero emitter to base current_______________volts 29

*Example 2*

A body of germanium was selectively etched in the following manner. A mask consisting of an underlying layer of boron trioxide of uniform thickness of 60 angstroms, and an outer layer consisting of 75 atomic percent gold and 25 atomic percent silver of uniform thickness of 1600 angstroms, was deposited on a portion of the surface of the germanium in accordance with the procedure described in Example 1. The germanium body was stream-etched in CP–8 etchant for a period of 8 seconds.

The mask was removed by immersing the germanium body in a supersonically agitated bath consisting of equal parts of isopropyl alcohol and water. Removal time was approximately 10 seconds.

The portion of the germanium body which was covered by the mask was found to have been unaffected by the etching step.

*Example 3*

A body of silicon was selectively etched in the following manner. A mask consisting of an underlying layer of boron trioxide of uniform thickness of 50 angstroms, and an outer layer consisting of 75 atomic percent gold and 25 atomic percent palladium of uniform thickness of 2300 angstroms, was deposited on a portion of the surface of the germanium in accordance with the procedure described in Example 1.

The germanium body was dip-etched in CP–8 etchant for a period of 8 seconds.

The mask was removed by immersing the silicon body in a supersonically agitated bath consisting of equal parts of isopropyl alcohol and water. Removal time was approximately 10 seconds.

The portion of the silicon body which was covered by the mask was found to have been unaffected by the etching step.

*Example 4*

A body of germanium was selectively etched in the following manner. A mask consisting of an underlying layer of boron trioxide of uniform thickness of 110 angstroms, and an outer layer consisting of 75 atomic percent gold and 25 atomic percent silver of uniform thickness of 1600 angstroms, was deposited on a portion of the surface of the germanium in accordance with the procedure described in Example 1.

The germanium body was stream-etched in CP–8 for a period of 8 seconds.

The mask was removed by immersing the germanium body in water. Removal time was approximately 10 seconds.

The portion of the germanium body which was covered by the mask was found to have been unaffected by the etching step.

It is to be appreciated that the examples and illustrative embodiments described above are intended only to typify the invention and aid in the description thereof. Variations may be made by one skilled in the art without departing from the spirit and scope of this invention.

What is claimed is:

1. The method of selectively etching a crystalline semiconductive surface which comprises applying an adherent coating to an area not to be etched, applying an etching resist layer upon the said adherent coating, subjecting the said semiconductive surface to an etchant and removing the resist by dissolving the adherent coating.

2. The method of claim 1 in which the peripheral edge of the said adherent coating has a thickness in the range of from 10 to 200 microns.

3. The method of claim 2 in which the thickness of said etching resist layer is in the range of from 500 to 5000 angstroms.

4. The method of claim 1 in which said etching resist layer is removed by a solvent comprising water.

5. The method of claim 4 in which said adherent coating consists of boron trioxide.

6. The method of claim 4 in which said adherent coating consists of phosphorus pentoxide.

7. The method of claim 1 in which said crystalline semiconductive surface consists essentially of silicon, the said etchant comprises concentrated nitric acid and concentrated hydrofluoric acid and said etching resist layer comprises gold.

8. The method of claim 7 in which said adherent layer consists essentially of boron trioxide.

9. The method of claim 1 in which said crystalline semiconductive body consists essentially of germanium, the said etchant comprises concentrated nitric acid and concentrated hydrofluoric acid and said etching resist layer comprises gold.

10. The method of claim 9 in which said adherent coating consists essentially of boron trioxide.

11. The method of claim 1 in which said crystalline semiconductor body is a transistor consisting essentially of germanium, said adherent coating consists essentially of boron trioxide, said etching resist layer comprises a material selected from the group consisting of gold, palladium, and platinum, said etchant consists essentially of concentrated nitric acid and concentrated hydrofluoric acid, and said etching resist layer is removed by a solvent comprising ethyl alcohol and water.

12. The method of claim 11 in which the peripheral edge of said adherent coating has a thickness in the range of from 10 to 200 microns.

13. The method of claim 11 in which said etching resist layer consists of at least an alloy of 75 atom percent gold and the remainder silver.

14. The method of claim 11 in which said etching resist layer consists of at least 75 atom percent gold and the remainder aluminum.

References Cited in the file of this patent

UNITED STATES PATENTS

| | | |
|---|---|---|
| 2,780,569 | Hewlett | Feb. 5, 1957 |
| 2,879,147 | Baker | Mar. 24, 1959 |